(12) United States Patent
Schlenker et al.

(10) Patent No.: US 11,215,810 B2
(45) Date of Patent: Jan. 4, 2022

(54) OPTICAL ASSEMBLY

(71) Applicant: Schölly Fiberoptic GmbH, Denzlingen (DE)

(72) Inventors: Stefan Schlenker, Freiburg (DE); Markus Gern, Freiburg (DE)

(73) Assignee: Schölly Fiberoptic GmbH, Denzlingen (DE)

( * ) Notice: Subject to any disclaimer, the term of this patent is extended or adjusted under 35 U.S.C. 154(b) by 258 days.

(21) Appl. No.: 16/201,191

(22) Filed: Nov. 27, 2018

(65) Prior Publication Data

US 2019/0170999 A1 Jun. 6, 2019

(30) Foreign Application Priority Data

Dec. 4, 2017 (DE) .................. 102017128668.3

(51) Int. Cl.
*G02B 23/24* (2006.01)
*G02B 7/02* (2021.01)

(52) U.S. Cl.
CPC ......... *G02B 23/2476* (2013.01); *G02B 7/023* (2013.01); *G02B 7/025* (2013.01)

(58) Field of Classification Search
CPC .... G02B 23/2476; G02B 7/025; G02B 7/023; G02B 23/2423
USPC ................................ 359/808–809
See application file for complete search history.

(56) References Cited

U.S. PATENT DOCUMENTS

| 5,706,143 | A | 1/1998 | Hipp |
| 5,978,161 | A | 11/1999 | Lemke |
| 6,285,496 | B1 | 9/2001 | Bauer et al. |
| 2015/0351879 | A1 | 12/2015 | Boltanski |
| 2017/0065157 | A1* | 3/2017 | Iwasaki ............... H04N 5/2254 |

FOREIGN PATENT DOCUMENTS

| DE | 19521654 | 12/1996 |
| DE | 19718189 | 11/1997 |
| DE | 19733490 | 2/1999 |

* cited by examiner

*Primary Examiner* — Robert E. Tallman
(74) *Attorney, Agent, or Firm* — Volpe Koenig

(57) ABSTRACT

An optical assembly (1, 100) is provided, including an optical functional unit (2), a housing (3), which at least partly encloses the optical functional unit (2), and an adjusting device (4), by which a desired position of the optical functional unit (2) relative to an optical axis (16) of the optical assembly (1, 100) is settable. The adjusting device (4) is configured to the effect that the position of the optical functional unit (2) is set by way of an operative connection (5) between an actuation part (9, 10) and a holding part (11, 12, 28, 29) of the adjusting device (4). The operative connection (5) is configured in the region of a closed housing wall (6), and wherein the optical functional unit (2), after the setting of the desired position, is fixable in this position.

20 Claims, 3 Drawing Sheets

OPTICAL ASSEMBLY

INCORPORATION BY REFERENCE

The following documents are incorporated herein by reference as if fully set forth: German Patent Application No. 10 2017 128 668.3, filed Dec. 4, 2017.

BACKGROUND

The invention relates to an optical assembly, wherein the optical assembly has at least one optical functional unit, a housing, which at least partly encloses the optical functional unit, and an adjusting device for setting a desired position of the optical functional unit within the housing and relative to the housing. The optical assembly can be provided for example for image transmission, in particular on an endoscope.

Optical assemblies of the type mentioned in the introduction are already known. In previously known optical assemblies, the adjusting device is often configured as one or a plurality of mechanical adjusting screws. In this case, the adjusting screws can project through a housing opening in order to enable an adjustment of the optical functional unit arranged in the interior of the housing. Adjusting devices of this type are often provided to set a for example centered position of the optical functional unit within a housing, such that an optical axis of the optical assembly extends in particular in a centered fashion through the optical functional unit.

In this case, the housing of the optical assembly is fitted only after the setting of a desired position of the optical functional unit, for example relative to a housing carrier. The subsequent fitting of the housing often results in an adjustment of the position of the optical functional unit relative to a housing carrier and the housing fitted to the housing carrier, said adjustment occurring on account of the mounting of the housing. Therefore, after completion of housing mounting, the optical functional unit is often no longer in the desired position formerly set.

Under certain circumstances, a hermetic encapsulation of the functional elements of the optical assembly that are arranged within the housing may even be provided. In this case, the orientation of the optical functional unit is often particularly difficult and complex. This is because, in order to achieve a hermetic sealing of the housing it is not possible to provide openings in the housing through which for example mechanical adjusting screws are led. However, since the optical functional unit and/or further components are arranged within the housing in the case of a hermetic encapsulation, the encapsulation has to be canceled again in order to readjust the position of the optical functional unit. There is the risk of the optical functional unit being adjusted again while the hermetic encapsulation is being produced.

SUMMARY

The object, therefore, is to provide an optical assembly of the type mentioned in the introduction which overcomes the disadvantages mentioned.

This object is achieved by one or more features of the invention. In particular, in order to achieve the object in the case of an optical assembly of the type mentioned in the introduction the invention thus provides that the adjusting device, in particular at least one holding part of the adjusting device, is operable via an operative connection from outside the housing, that a housing wall at least partly enclosing the optical functional unit is formed in a closed fashion at least in the region of the operative connection, and that the optical functional unit, after the setting of the desired position, is fixable therein. In this case, it can be particularly expedient if the adjusting device or a part thereof is adjustable from outside the housing. The optical assembly according to the invention has the advantage that a housing is firstly closed and it is only afterward that the optical functional unit is finally oriented and fixed in the desired position. The housing thus no longer need be repeatedly opened and closed in order to set the position of the optical functional unit. A hitherto lengthy and complex setting process has therefore been significantly accelerated and considerably simplified on the basis of the optical assembly according to the invention. In particular, by use of the adjusting device of the optical assembly according to the invention, it is possible to adjust a position of the optical functional unit within the housing relative to an optical axis of the optical assembly and/or relative to an optical axis of an endoscope in which the optical assembly is installed.

According to the invention, therefore, a fixing medium can be provided, in particular, with which the optical functional unit is fixable in a set positioning relative to the carrier and in particular any desired positioning, wherein the fixing medium fixes the optical functional unit in the use position. For this purpose, it is expedient if the optical functional unit is adjustable in at least two degrees of freedom before fixing. The adjustability is preferably dimensioned such that the optical functional unit is adjustable in the entire field of view.

Advantageous developments of the optical assembly are described below, which are combinable with the features of the above paragraph individually or in combination with one another.

In accordance with one advantageous development, provision can be made for the optical functional unit to be suspended from a carrier. The carrier allows the optical functional unit to be adjusted securely in specific degrees of freedom. In this case, the carrier can be produced from a plastic and/or from a metal. In particular, the metal can be nonmagnetic or weakly magnetic. Alternatively or supplementarily, in accordance with one advantageous development, provision can be made for the carrier to be configured from a ferromagnetic material and for a material accumulation of the ferromagnetic material to be provided instead of one magnet or a plurality of magnets. This material accumulation makes it possible to amplify a magnetic force between a magnetic actuation part, for example the one described herein, and the material accumulation in these regions. Consequently, this also makes it possible to carry out an adjustment of the optical functional unit. The material accumulation can thus correspond to a holding part, for example the one mentioned herein, which holds a magnet in the case of the configurations likewise described herein and which is operatively connected to the actuation part.

It can be particularly expedient if the carrier is produced by a 3D printing method. The use of 3D printing technology makes it possible to produce carrier forms that are not producible by other methods, such as, for example, injection molding technology or machining of a material. It can be particularly expedient if the housing encloses the carrier and the optical functional unit.

Preferably, the carrier has a geometric shape that allows mobility in two movement axes and prevents mobility in a third movement axis. This is achievable for example by strip-shaped structures.

In order to achieve a good fixing of the optical functional unit in a desired position within the housing, it can be advantageous if the position of the optical functional unit is fixable by a fixing medium. In this case, the fixing medium can be configured for example to fix the carrier and/or the adjusting device and/or a holding part. Consequently, it is thereby possible directly and/or indirectly for the optical functional unit also to have been or to be fixed in its position. In this case, it can be particularly advantageous if a permanent fixing is possible by the fixing medium, in particular wherein the permanent fixing is not able to be canceled without being destroyed. This makes it possible to prevent the occurrence of a subsequent adjustment of the position of the optical functional unit relative to the housing. The fixing medium can be activatable for example thermally, chemically, electrically, magnetically, optically and/or mechanically.

In order to be able to better prevent the optical functional unit and/or further components arranged within the housing of the optical assembly from being damaged by moisture and/or gases, the optical functional unit and/or further components arranged within the housing can be hermetically encapsulated by the housing. In particular, the optical functional unit can thus be adjusted without the hermetic encapsulation being opened. In this case, the operative connection can be based at least partly on a remote action and be guided in particular through a preferably hermetically sealed housing.

In accordance with one particularly advantageous development of the optical assembly, provision can be made for the operative connection to be realized by at least one magnetic coupling. This enables for example a non-contact force transmission of an actuation force generated outside the housing to the optical functional unit arranged in the interior of the housing. In this case, it can be particularly expedient if an actuation force applied externally, in particular on an actuation part, is transmitted to a carrier or the carrier already mentioned and/or to a holding part or the at least one holding part already mentioned. A further advantage in this case is that it is possible for the position of the optical functional unit to be set without current, that is to say that, in particular, no energy source is necessary.

Alternatively or supplementarily, in accordance with a further advantageous development, provision can be made for the operative connection to be realized by an electrical coupling. In this case, the electrical coupling can be configured via an electrical line and/or in a wireless fashion, for example via a radio link. In this regard, an operating part can be arranged for example on an outer side of the housing, said operating part being configured to control an actuator in the interior of the housing in order thus to adjust the optical functional unit in its position relative to the housing.

In order to enable a particularly rapid and effective fixing of a fixing medium, in particular the one already mentioned, the housing can have at least one observation window. The observation window can thus be arranged in the housing in such a way that an activation of the fixing medium is possible through the observation window. If the fixing medium is a light-curable adhesive and/or plastic, then the fixing medium can preferably be activated by irradiation with light having a specific wavelength, wherein for example a chain polymerization is able to be induced by the irradiation with light. This enables a particularly fast curing of the fixing medium.

In accordance with one advantageous configuration of the optical assembly, it is possible for a fixing medium, in particular the fixing medium already mentioned above, to have been or to be realized as a cohesive connection. As already mentioned above, the fixing medium can be configured as a curable or cured adhesive and/or plastic. This has the advantage that a fixing without current is possible, that is to say that, in particular, no energy source is necessary in order to carry out a fixing. In order to enable a curing that is able to be induced temporally particularly precisely and/or without vibration, it can be particularly advantageous if the fixing medium is configured as an adhesive and/or plastic curable or cured by UV light. The fixing medium can thus be introduced into the housing, in particular in non-cured form, before the housing is closed, such that a curing is possible after the setting of the desired position of the optical functional unit with the housing closed, in particular hermetically sealed. Consequently, an undesired, subsequent adjustment of the optical functional unit can also be prevented.

Alternatively or supplementarily, the fixing medium can be configured in such a way that it is possible for the fixing medium to be cured by an external energy supply, such as heat supply, for example. Furthermore, as an alternative or in addition thereto, the fixing medium can be configured in such a way that a time-dependent curing is effected.

In accordance with a further advantageous configuration, as an alternative or in addition to configuration possibilities mentioned above, the fixing medium can be realized as a welding connection and/or as a soldering connection. Cohesive fixings are generally configured in an irreversible fashion and therefore have a particularly long lifetime.

A further configuration of the optical assembly, in particular as an alternative or in addition to the cohesive fixing possibilities, can be achieved by the fixing medium being configured as a mechanical fixing medium, in particular as a mechanical clamping element. In order to enable the optical functional unit to be fixed in a desired position without opening the housing, it can be expedient if the mechanical fixing medium is activatable or was activated externally after the housing was closed. In this case, it can be particularly preferred if the mechanical fixing medium has at least two, in particular plane-parallel, plates that are pressed against one another in the fixing state. This has the advantage that a fixing is configured in a releasable, that is to say reversible, fashion and a readjustment of the position of the optical functional unit within the housing is thus possible. In this case, the plates can be removable from one another externally without contact, for example by magnetic forces, in order to release the fixing.

For setting the desired position of the optical functional unit in relation to the housing, it can be advantageous if the optical functional unit is adjustable relative to the housing in at least two degrees of freedom or movement axes lying in a transverse plane, which can be oriented for example transversely, in particular perpendicularly, with respect to an optical axis or longitudinal axis. In order to limit the number of degrees of freedom, such that a particularly simple setting of the desired position is possible, provision can be made for the position of the functional unit to be adjustable exclusively in two degrees of freedom lying in the transverse plane.

In this case, the transverse plane can be oriented in particular perpendicularly to an optical axis, in particular the optical axis of the optical assembly as already mentioned above.

In order to hamper or to prevent an adjustment in degrees of freedom other than the two mentioned above, in order to achieve an accurate positioning in a desired or optimum position, the carrier can be configured as one restoring element or a plurality of restoring elements or have one restoring element or a plurality of restoring elements. One exemplary, suitable embodiment of a restoring element can be configured as a torsionally stiff spring and/or as a spirally guided spring. In accordance with one advantageous embodiment, it can be particularly advantageous in this case if an aspect ratio of 5:1, preferably of 10:1, is provided. The carrier thus requires relatively little space, but has a sufficient stiffness to generate a restoring force. The restoring force generated by the carrier is directed oppositely to an adjusting force, wherein the adjusting force for setting the position of the optical functional unit acts on the carrier. Consequently, the generatable adjusting force must be greater than the restoring force developed by the carrier. What can additionally be achieved in this way is that the optical functional unit returns to the initial position as soon as the adjusting force is reduced. The generation of an opposite force is not required.

The restoring element can alternatively or additionally be configured as a spirally guided spring. Here a strip-shaped restoring element can be formed by an aspect ratio, for example the aspect ratio mentioned above. The strip shape is preferably oriented with its width parallel to a winding axis of the spiral shape.

In accordance with one particularly advantageous configuration of the optical assembly, provision can be made for the adjusting device to have at least one actuation part arranged outside the housing or on an outer side of the housing, and to have at least one holding part, wherein the at least one holding part is connected or coupled to the carrier and/or to the optical functional unit. It is thus possible for a force applied on the actuation part to be transmitted via the operative connection to the holding part and as a result also to the optical functional unit. It can be particularly expedient in this case if the actuation part is arranged at a distance and/or offset by an angle from the housing and/or separated from the housing by a free space. It is thus possible to alter a magnetic force acting on the at least one holding element by altering the distance and/or the angle between the at least one actuation part and the housing. In this case, the magnetic force can relate to a magnetic attractive and/or repulsive force.

In accordance with a further advantageous configuration, as a result of actuation of the actuation part, an actuation force can be transmittable to the at least one holding part and/or the optical functional unit through a housing wall. This can be provided in particular such that the at least one holding part together with the optical functional unit is adjusted relative to the housing. Alternatively or supplementarily, it can furthermore be expedient if a housing wall is arranged between the at least one actuation part and the at least one holding part, through which housing wall the at least one actuation part and the at least one holding part are magnetically coupled or couplable to one another. This provides a possibility of adjusting, without current, the optical functional unit at least partly enclosed by the housing, by which a particularly precise setting of the position is possible.

Another advantageous configuration of the optical assembly can be distinguished by the fact that the optical assembly has at least one first magnetic coupling for adjusting the optical functional unit in a first direction, preferably along an x-axis, and a second magnetic coupling for adjusting the optical functional unit in a second direction, preferably along a y-axis. In this case, it can be particularly advantageous if each of the magnetic couplings mentioned above has at least one electromagnet and/or permanent magnet. In this case, it can be expedient if the at least one magnet is arranged at the holding part and/or at the actuation part, such that for example upon actuation of the actuation part the magnet is adjusted together with the actuation part and/or that upon an adjustment of the magnet at the holding part by transmission of a magnetic force, the holding part is adjusted together with the magnet. As a counterpart to the magnet, a ferromagnetic element and/or a correspondingly polarized further magnet can be provided. In particular, a material accumulation, or the material accumulation already mentioned above, of a ferromagnetic carrier material can be provided as counterpart to the magnet.

In the case of a configuration of the magnetic coupling comprising two magnets, the latter can be oriented toward one another in such a way that a magnetic attractive force and/or a magnetic repulsive force are/is generated. In order to be able to achieve a particularly simple setting of the position by the two magnetic couplings, it can be advantageous if the first and second magnetic couplings are arranged offset by an angle, in particular an angle of 90 degrees, with respect to one another. An adjustment direction can therefore be defined in each case by the arrangement of the two magnetic couplings. Provision can thus be made for the degrees of freedom to be defined at least partly by the magnetic couplings.

Particularly in the case of a rotationally symmetrical configuration of the optical functional unit, in accordance with a further configuration of the optical assembly it can be advantageous if a or the already mentioned first magnetic coupling is formed between a first actuation part and a first holding part and the second magnetic coupling is formed between a second actuation part and a second holding part. It is thus possible to adjust the first and second holding parts independently of one another in, in particular different, adjustment directions. Exclusively the first holding part is adjusted upon an actuation of the first actuation part and exclusively the second holding part is adjusted upon an actuation of the second actuation part.

In accordance with one particularly preferred development, provision can be made for the first and second holding parts to be rotatable in each case about a rotation axis. In this case, the rotation axes of the holding parts can be oriented at different distances with respect to an optical axis of the optical assembly. The holding parts can thus have different rotation axes which can be arranged in particular skew and/or parallel and/or at a distance with respect to one another.

In accordance with a further, likewise preferred development, provision can alternatively or supplementarily be made for the optical functional unit to be arranged eccentrically with respect to the rotation axis of the second holding part in the second holding part and/or for the second holding part to be arranged eccentrically with respect to the rotation axis of the first holding part in the first holding part. Preferably, the second holding part can in this case be mounted rotatably within the first holding part and/or the first holding part can in this case be mounted rotatably within the housing. The rotation axes of the holding parts can moreover be arranged differently, in particular skew and/or parallel, with respect to one another and/or with respect to the optical axis of the optical assembly.

It can furthermore be provided that, in the case of the configuration of the optical assembly as described in the paragraphs above, the first holding part and the second holding part are configured as disks, in particular as perforated disks. It can furthermore be particularly expedient if the two holding parts have a circular basic area. Alternatively or supplementarily, the first and second actuation parts can have a circular basic area and/or be arranged axially offset with respect to one another. Consequently, an incorrect coupling of the actuation elements arranged axially offset with respect to one another to a holding part not provided for the coupling is precluded since the magnets and/or the ferromagnetic elements on the holding parts are also arranged axially offset in a corresponding manner to the magnets and/or the ferromagnetic elements on the actuation parts. Consequently, the magnet on a first holding part can be arranged axially offset with respect to a magnet on a second holding part. Magnets can also be replaced or supplemented by ferromagnetic elements if a magnet has already been arranged at the corresponding actuation element, or vice versa. As a result of such an, in particular rotationally symmetrical, configuration of the optical functional unit, it is possible moreover to adjust the position of the optical functional unit on a circular path by carrying out a rotational movement of an actuation part.

In order to enable the position of the optical functional unit to be adjusted exclusively in specific degrees of freedom, it can be advantageous if the degrees of freedom in the adjustment of the optical functional unit are defined by a guide device. In this case, it can be particularly advantageous if the guide device permits the adjustment of the optical functional unit exclusively in the transverse plane. This can be achieved for example by the guide device being configured as a guide surface, against which the optical functional unit and/or the carrier and/or the holding part bear(s). The guide device can furthermore be provided for producing a cohesive connection, for example by adhesive bonding of the carrier and/or at least one holding part and the guide device by the fixing medium.

The guide device can furthermore have a through opening, through which an optical axis, in particular the optical axis mentioned above, extends. The through opening is preferably configured in a round fashion. Consequently, the guide surface of the guide device which surrounds the through opening and against which for example at least one holding part and/or the carrier bear(s) in the fixing state can be configured to be as large as possible and can establish contact for example with the at least one holding part and/or with the carrier over the widest possible area. It can furthermore be preferred for a diameter, in particular a maximum diameter, of the through opening to be configured to be greater than a diameter, in particular a maximum diameter, of the optical functional unit.

In accordance with one particularly advantageous configuration of the optical assembly, the optical functional unit can be configured in a rotationally symmetrical, in particular circular, fashion. Alternatively or supplementarily, the optical functional unit can also be configured in an angular, in particular rectangular or square, fashion.

The optical functional unit can be one or a combination of two or more of the following components: lens, lens system comprising a plurality of lenses, image sensor, diaphragm. Preferably, the optical functional unit is an achromat or the optical functional unit has an achromat.

In accordance with one advantageous development, the housing can be produced from a nonmagnetic material. This can preferably be a nonmagnetic high-grade steel. It is thus possible to prevent the operative connection from being impaired by the housing, for example because an undesired magnetic coupling of the housing to a part of one of the magnetic couplings described above occurs.

Provision can furthermore be made for the optical assembly to have a light entrance side and a light exit side. In this case, it can be particularly expedient if the light entrance side and/or the light exit side are/is connected to a or to a respective optical waveguide. As a result, the optical assembly can be integrated into an image transmission chain for example via the optical waveguides. In particular, the light entrance side can relate to a side of the optical assembly facing away from the light exit side. Preferably, the light exit side and the light entrance side relate to opposite sides of the optical assembly.

The invention additionally relates to an endoscope comprising an optical assembly as described and claimed herein. The optical assembly can thus be provided for example for relaying images in an endoscope. The use of such an optical assembly in an endoscope has the advantage that an endoscope housing, which can also correspond to the housing of the optical assembly, is mounted and the position of an optical functional unit is set only subsequently. Consequently, a hermetic sealing of the endoscope housing can also be carried out before the optical functional unit is correctly oriented. In particular, an image centering of the endoscope can thus be carried out, wherein in this case an optical functional unit configured as an achromat, for example, is adjustable relative to an optical axis of the endoscope and/or of the optical assembly.

In accordance with one advantageous development of the endoscope, the optical assembly can be arranged in an endoscope shaft of the endoscope.

The invention furthermore relates to a method for orienting an optical functional unit within a housing, preferably within an endoscope housing, in particular by using the optical assembly as claimed in any of the preceding claims, comprising the following steps:

setting the position of the optical functional unit within the, in particular hermetically sealed, housing, in particular in at least two degrees of freedom lying in a transverse plane, by way of an operative connection operated from outside the housing, wherein a housing wall at least partly enclosing the optical functional unit is formed in a closed fashion at least in the region of the operative connection, fixing the optical functional unit in a desired position, in particular by activating a fixing medium.

In particular, a centering of the optical functional unit can be carried out by the method, preferably such that the midpoint of said optical functional unit lies in an optical axis of the optical assembly and/or of the endoscope.

Advantageous developments of the method have already been mentioned above with regard to the optical assembly, to which developments reference is hereby made and which developments are combinable with the features above.

It can be particularly advantageous if the operative connection is generated by a magnetic and/or an electrical coupling. Suitable configuration possibilities have already been described thoroughly hereinabove.

The optical assembly is thus particularly suitable for a use for orienting an optical functional unit. In this case, a position of the optical functional unit can be adjusted relative to the housing and/or to an optical axis of the assembly by the operative connection, wherein the housing wall is closed in the region of the operative connection.

In accordance with one preferred development of the method, before the housing is mounted and/or closed, a fixing medium can be arranged in a later housing interior, for example on a holding part and/or a carrier and/or a guide device, and be brought to its fixing state only after the housing has been closed. Suitable fixing medium which can find application in the method as well have already been described herein. The fixing medium makes it possible to carry out a fixing of a desired position of the optical functional unit within the housing. In particular, the activation of the fixing medium is carried out if the housing has already been closed at least in the region of the operative connection. Preferably, the housing has already been completely closed, in particular hermetically sealed. The fixing medium is preferably activated in a light-induced manner.

The invention thus relates to an optical assembly, comprising an optical functional unit, a housing, which at least partly encloses the optical functional unit, and an adjusting device, by which a desired position of the optical functional unit relative to an optical axis of the optical assembly is settable, wherein the adjusting device is configured to the effect that the position of the optical functional unit is set by way of an operative connection between an actuation part and a holding part of the adjusting device, wherein the operative connection is configured in the region of a closed housing wall, and wherein the optical functional unit, after the setting of the desired position, is fixable in this position.

BRIEF DESCRIPTION OF THE DRAWINGS

The invention will now be described in greater detail on the basis of a plurality of exemplary embodiments illustrated, but is not restricted to these exemplary embodiments. Further exemplary embodiments result from the combination of the features of individual or a plurality of claims among one another and/or with individual or a plurality of features of the exemplary embodiments.

In the figures.

DETAILED DESCRIPTION

Figure 1:
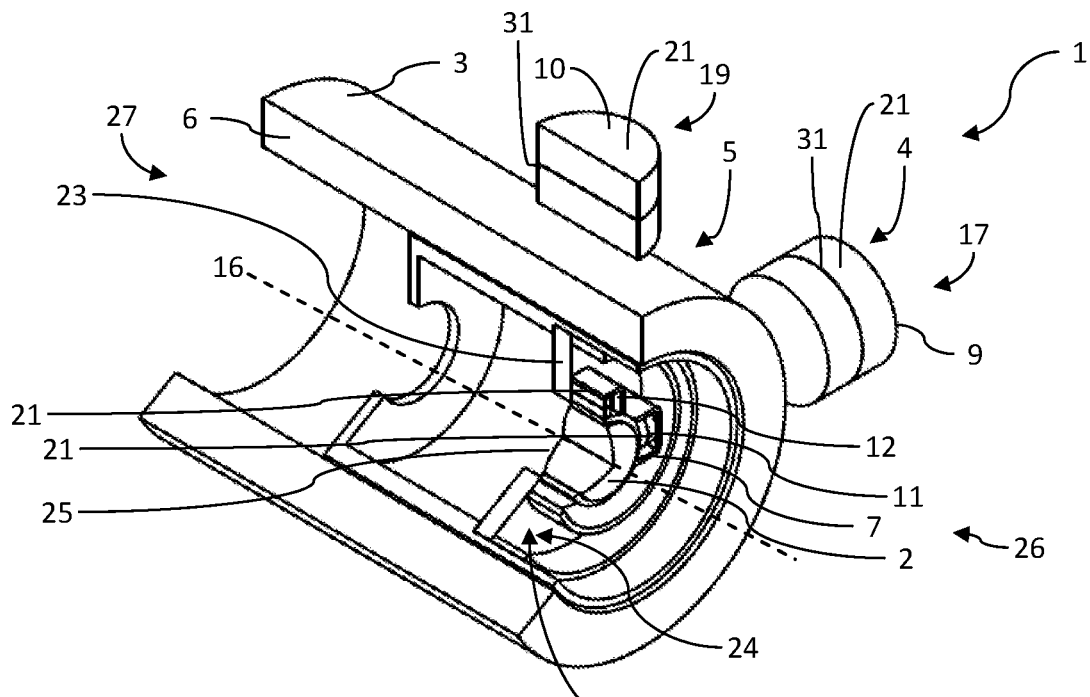
FIG. 1 shows a partly cutaway embodiment of an optical assembly in perspective view, wherein the position of the optical functional unit is set by an adjustment of the actuation parts in respective radial directions.
Figure 2:
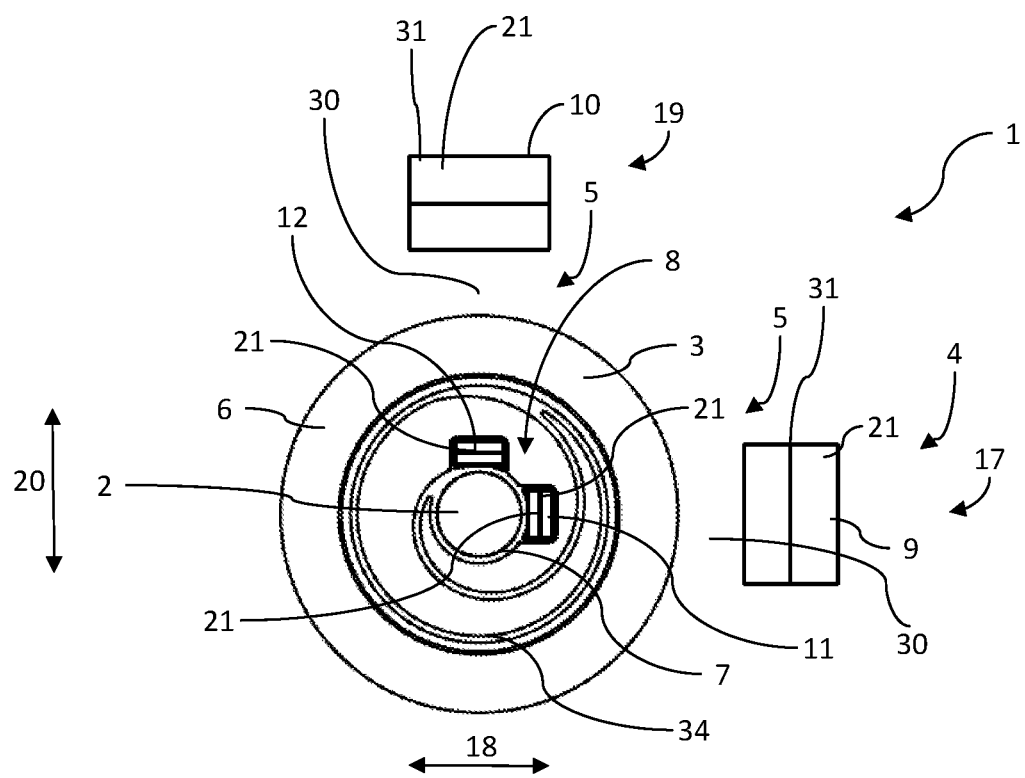
FIG. 2 shows a cross section through the embodiment of the optical assembly from FIG. 1.
Figure 3:
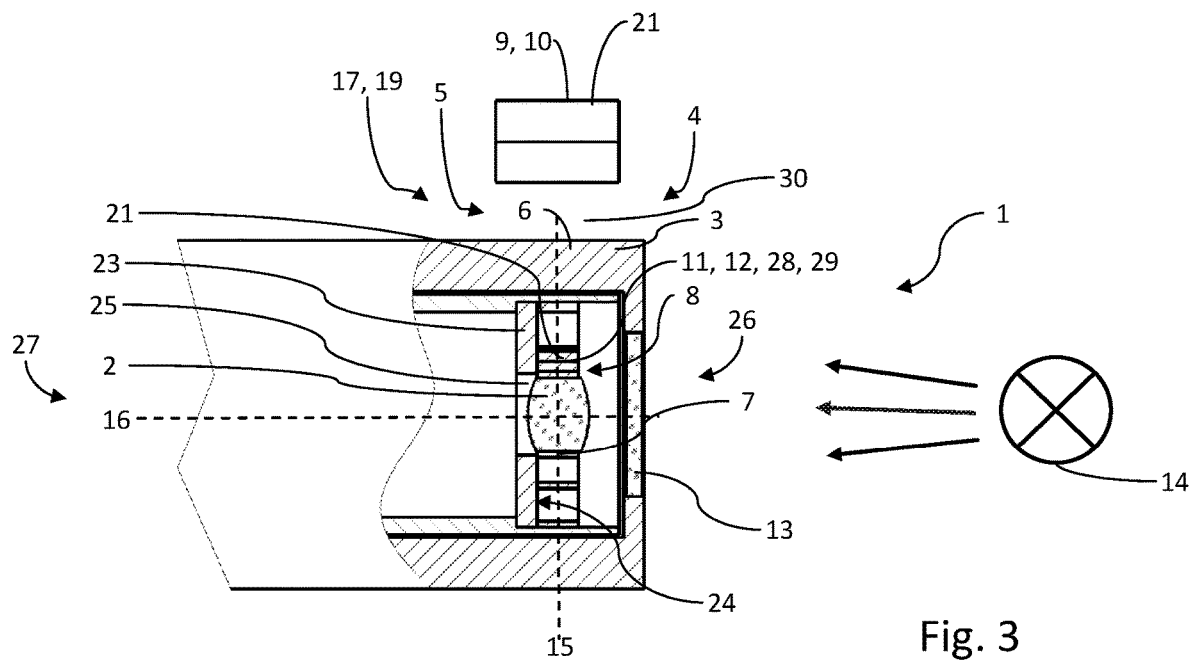
FIG. 3 shows a longitudinal section through an optical assembly in which the optical functional unit is fixed in a set position within the housing by a light-induced curing of the fixing medium.

FIGS. 1 to 3 show a first possible embodiment of an optical assembly according to the invention, which is designated in its entirety as 1.

FIGS. 8 to 13 show a further possible embodiment of an optical assembly according to the invention, which is designated in its entirety as 100.

However, the invention is not restricted to these two embodiments. Rather, it is possible to combine individual features or combinations of features of the different embodiments with one another.

The optical assembly 1, 100 has at least one optical functional unit 2. The optical functional unit 2 can have one or a combination of at least two of the following components or be configured as one or a combination of at least two of the following components, which are: lens, lens system comprising a plurality of lenses, image sensor, diaphragm and/or achromat. The optical functional unit 2 can be configured for example in a circular and/or angular, in particular square, fashion depending on its function.

The optical assembly 1, 100 has a housing 3, in which the optical functional unit 2 is housed. A hermetic encapsulation of components can be configured by the housing 3, said components being arranged within the housing 3. The housing 3 has a light entrance side 26 and a light exit side 27. Consequently, the optical assembly 1, 100 can be integrated ideally into an image transmission chain, for example of an endoscope. The housing 3 is produced from a nonmagnetic material, such as from a nonmagnetic high-grade steel, for example.

By use of an adjusting device 4, it is possible to set the position of the optical functional unit 2 within the housing 3 relative to the housing 3 and/or a housing carrier and/or an optical axis 16 of the optical assembly 1, 100. The adjusting device 4 makes it possible to adjust the position of the optical functional unit 2 relative to the housing 3 and/or to the optical axis 16 and/or to a housing carrier in two degrees of freedom.

The special characteristic thereof is that the optical functional unit 2 is adjustable via an externally operable operative connection 5. Externally can relate here to outside the housing 3. The operative connection 5 is generated by the adjusting device 4, such that as a result of operation of the adjusting device 4 externally, the optical functional unit 2 is adjusted within the housing 3, without the housing 3 having to be demounted from a housing carrier in the process. This makes it possible to form the housing 3 in a closed fashion at least in the region of the operative connection 5.

The adjusting device 4 has at least one actuation part 9, 10 and at least one holding part 11, 12, 28, 29, between which the operative connection 5 is realized. Upon an actuation of the first actuation part 9, it is thus possible to carry out an adjustment of the first holding part 11 in a predefined direction, in particular along an x-axis 18. Upon an actuation of the second actuation part 10, it is thus possible to carry out an adjustment of the second holding part 12 in a predefined direction, in particular along a y-axis 20. In the case of this configuration, therefore, two operative connections 5 are set up, wherein one exists between the first actuation part 9 and the first holding part 11 and one exists between the second actuation part 10 and the second holding part 12.

As is shown in FIGS. 1 to 3 and 8 to 13, the operative connections 5 can be in each case magnetic couplings 17, 19. The magnetic attractive and/or repulsive forces that are generatable by the magnetic couplings 17, 19 can be utilized here for setting the position of the optical functional unit 2. In this case, the magnetic attractive and/or repulsive forces act through the housing wall 6, such that the housing wall 6 of the housing 3 is formed in a closed fashion at least in the region of the magnetic forces acting. The housing wall 6 thus has in particular no openings for adjusting screws or the like in this region.

Figure 4:
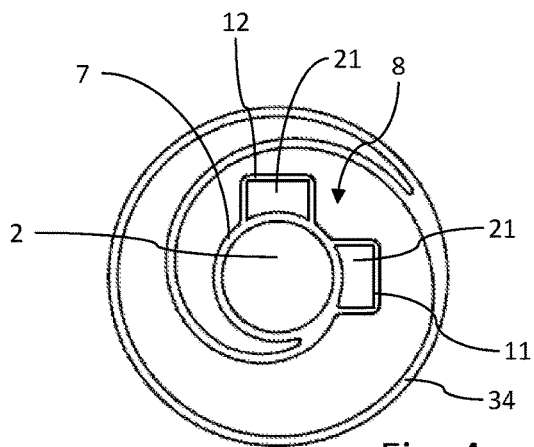
FIG. 4 shows one possible embodiment of a carrier, wherein in this case the carrier is configured as a spiral spring and the optical functional unit is configured in a circular fashion.
Figure 5:
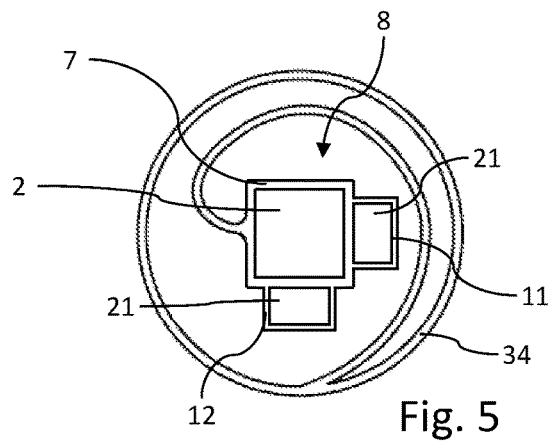
FIG. 5 shows a further possible embodiment of a carrier, wherein in this case the carrier is configured as a spiral spring and the optical functional unit is configured in a square fashion.

The optical functional unit 2 is suspended from a carrier 7. The housing 3 encloses at least partly, preferably completely, the carrier 7 and the optical functional unit 2 held thereon. The carrier 7 can be configured in various ways. In the case of the embodiment from FIGS. 1 to 5, the carrier 7 has at least one restoring element. By way of example, the restoring element can be configured as a spirally guided spring, wherein the spring is held on an in particular circumferential carrier ring 34 of the carrier 7 and runs spirally inward. Examples of this can be seen in FIGS. 4 and 5.

The carrier 7 has a rectangular cross section, wherein a wide side given by an aspect ratio is oriented along the optical axis of the optical functional unit 2. A torsional stiffness is thus provided, by which the optical functional unit 2 is guided adjustably in two degrees of freedom in a transverse plane with respect to the optical axis.

A mount for the optical functional unit 2 is formed at a free end region of the spiral spring. The first holding part 11 and the second holding part 12 are formed or arranged at said mount. In each case at least one magnet 21 and/or at least one ferromagnetic element are/is arranged in or at the holding parts 11, 12, 28, 29. The holding parts 11, 12, 28, 29 can thus be configured as pockets for the magnets 21 or the ferromagnetic elements. As already mentioned above, the holding parts 11, 12, 28, 29 are parts of the adjusting device 4 and serve for setting up a respective operative connection 5 that acts through a housing wall 6. For this reason, the first holding part 11 and the second holding part 12 are arranged offset by 90 degrees with respect to one another around the optical functional unit 2. It is thus possible, by the two resulting operative connections 5, to carry out in each case an adjustment in a different direction, in particular along different axes 18, 20.

Figure 6:
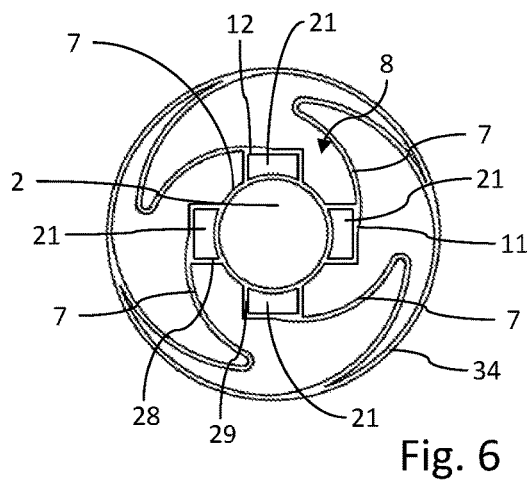
FIG. 6 shows a further possible embodiment of a carrier with a plurality of restoring elements configured as flat springs.
Figure 7:
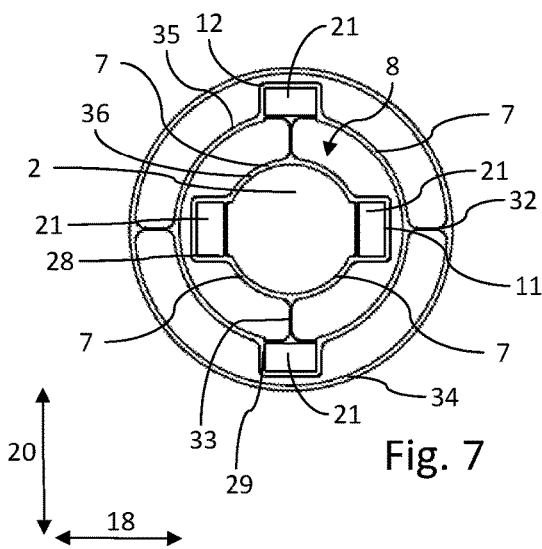
FIG. 7 shows a further possible embodiment of a carrier with a plurality of concentrically arranged restoring elements configured in a circular fashion.

FIGS. 6 and 7 illustrate further possible configurations of a carrier 7. The carriers 7 from FIGS. 6 and 7 each have four holding parts 11, 12, 28, 29 arranged in each case offset by an angle of 90 degrees with respect to one another around the optical functional unit 2. The holding parts 11, 12, 28, 29 are formed at the mount of the optical functional unit 2 and are held by a spring element in each case. The carrier 7 from FIG. 6 has four flat springs each configured in a V-shaped fashion. The quadruple suspension of the optical functional unit 2 makes it possible to better compensate for a disadvantageous expansion or contraction effect upon the occurrence of temperature changes. The carrier 7 from FIG. 7 has two circular spring elements 35, 36 arranged concentrically around a carrier midpoint, in particular. An outer spring element 35 is suspended from a carrier ring 34 by way of two horizontal connecting webs 32. An inner spring element 36 is suspended from the outer spring element 35 by way of two vertical connecting webs 33.

Two holding parts 11, 28 each having at least one magnet 21 are arranged at the inner spring element 36, said holding parts being arranged on opposite sides of the spring element 36 and in a horizontal. The holding parts 11, 28 thus allow an adjustment of the optical functional unit 2 on an x-axis 18. Two holding parts 12, 29 each having at least one magnet 21 are arranged at the outer spring element 35, said holding parts being arranged on opposite sides of the spring element 35 and in a vertical. The holding parts 12, 29 thus allow an adjustment of the optical functional unit 2 on a y-axis 20. Overall this results in an adjustability in two degrees of freedom x, y.

The first magnetic coupling 17 in the embodiments from FIGS. 1 to 3 and 8 to 13 is thus formed from the first actuation part 9 and the first holding part 11. The second magnetic coupling is formed from the second actuation part 10 and the second holding part 12. The actuation parts 9, 10 can be configured as at least one magnet 21 and/or as at least one ferromagnetic element and/or have at least one magnet 21 and/or at least one ferromagnetic element. The magnetic couplings here are thus realized in each case by the magnetic attractive and/or repulsive forces between mutually correspondingly arranged magnets 21 and/or ferromagnetic elements on an actuation part 9, 10 and on a holding part 11, 12. The magnets 21 can be configured in each case as a permanent magnet and/or as an electromagnet. Each magnetic coupling 17, 19 needs at least one magnet 21, which is arranged either on the actuation part 9, 10 and/or on the holding part 11, 12, 28, 29. However, it can be advantageous if magnets, in particular an identical number of magnets, are arranged both on the holding parts 11, 12, 28, 29 and on the actuation parts 9, 10. Embodiments comprising more than two magnetic couplings are also conceivable. Examples thereof are shown in FIGS. 6 and 7.

In order to limit the degrees of freedom for adjusting the position of the optical functional unit 2 to just two, the optical assembly 1, 100 has a guide device 23. The guide device 23 therefore defines the possible adjustment paths of the optical functional unit 2. As illustrated in FIGS. 1 to 3, the guide device 23 can be configured as a guide surface 24, against which the optical functional unit 2 and/or the carrier 7 and/or the holding part 11, 12, 28, 29 bear(s). Consequently, the optical functional unit 2 is adjustable only within a transverse plane 15 defined in particular by the guide surface 24. In this case, the transverse plane 15 is oriented perpendicular to the optical axis 16 of the optical assembly 1, 100. The guide device 23 has a through opening 25, through which the optical axis 16 extends. The guide device 23 is configured such that it is immobile relative to the housing 3.

Once the desired position of the optical functional unit 2 has been set, the latter is fixable in this position. The fixing can be carried out by a fixing medium 8, for example. The fixing medium 8 can be a cohesive connection or produce a cohesive connection. FIG. 3 shows one possible embodiment of the fixing medium 8 as a light-curable adhesive. This can be for example a relatively rapidly curable plastic that is curable by UV light irradiation, for example. Through an observation window 13 formed in the housing 3 it is possible, by irradiating the fixing medium 8 applied on the carrier 7 and/or a holding part 11, 12, 28, 29 before the mounting of the housing 3, with the housing 3 closed, to induce a curing of the fixing medium 8 arranged within the housing 3. In this case, the irradiation can be carried out by a corresponding light source 14 arranged outside or else, under certain circumstances, within the housing 3. However, the housing 3 is likewise closed in the region of the observation window 13 since the transition between observation window 13 and housing wall 6 does not have an opening and/or is even hermetically sealed. The curing of the fixing medium 8 makes it possible for example for a cohesive connection to be or to have been produced between the carrier 7 and/or a holding part 11, 12, 28, 29 with the guide device 23 and/or the housing 3 and/or the housing carrier and/or with any element of the optical assembly 1, 100 that is configured to be immobile relative to the housing 3.

The observation window 13 can be produced for example from transparent material, in particular from glass, and/or from sapphire glass.

In the embodiment from FIGS. 1 to 13, provision is made for a free space or air space 30 to be configured between the actuation parts 10, 11 and an outer side of the housing wall 6. In the case of the embodiments from FIGS. 1 to 7, said space 30 can serve to be able to alter a distance between the actuation parts 9, 10 and the housing wall 6. The air space 30 can thus be provided as adjustment space for the actuation parts 9, 10. By adjusting the distance between the actuation parts 9, 10 and an outer side of the housing wall 6, it is thus also possible to carry out an alteration of the magnetic attractive and/or repulsive forces acting on the holding parts 11, 12, 28, 29. This finally leads to an alteration of the position of the holding parts 11, 12, 28, 29 and of the optical functional unit 2 connected thereto within the housing 3.

The embodiment of the optical assembly 100 from FIGS. 8 to 13 has two, in particular hollow-cylindrical and/or perforated-disk-shaped, actuation parts 9, 10, which are mounted in each case rotatably about a rotation axis and have in each case at least one magnet 21 and/or ferromagnetic element on an inner side oriented in the direction of the housing 3. The optical assembly 100 furthermore has two holding parts 11, 12. The holding parts 11, 12 can likewise be configured as a hollow cylinder and/or as a disk, in particular as a perforated disk. The holding parts 11, 12 could therefore also be referred to as centering disks. The holding parts 11, 12 likewise have in each case at least one magnet 21 and/or ferromagnetic element arranged on an outer side oriented in the direction of the housing wall 6.

In this case, the optical functional unit 2 is arranged eccentrically in the second holding part 12 relative to a rotation axis of the second holding part 12. The second holding part 12 in turn is arranged eccentrically with respect to the rotation axis of the first holding part 11 in the first holding part 11. In this case, the second holding part 12 is mounted rotatably within the first holding part 11 and the first holding part 11 is mounted rotatably within the housing 3, in particular on an inner wall of the housing 3. The rotation axes of the first holding part 11 and of the second holding part 12 are arranged offset with respect to one another, but extend parallel to one another.

Figure 8:
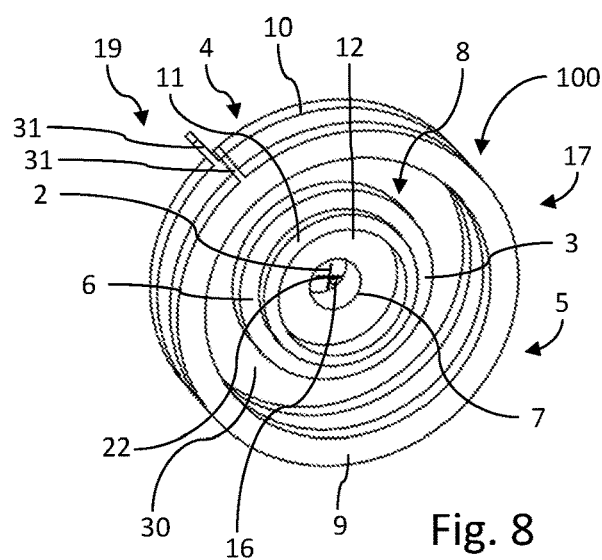
FIG. 8 shows a further possible embodiment of an optical assembly in perspective view, wherein a midpoint of the optical functional unit lies outside the optical axis of the optical assembly.
Figure 9:
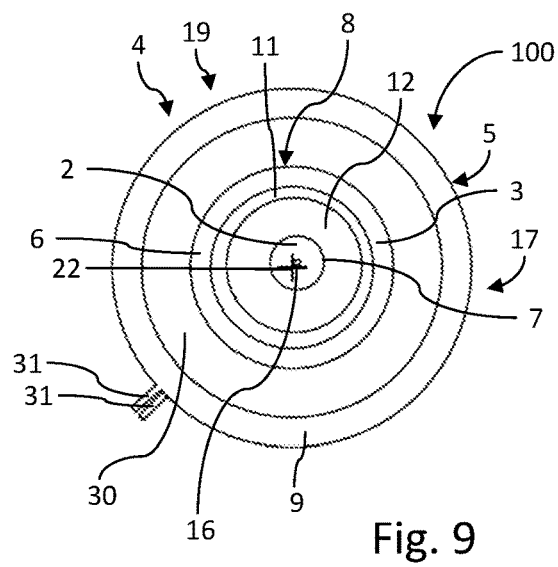
FIG. 9 shows the optical assembly in the setting in accordance with FIG. 8 in a plan view.
Figure 10:
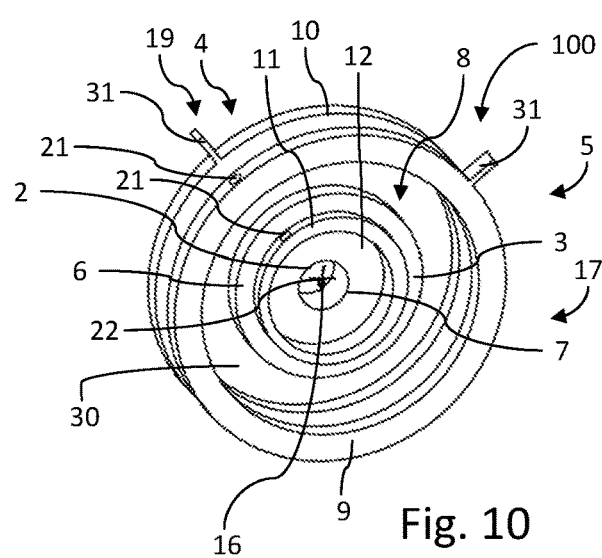
FIG. 10 shows the optical assembly from FIGS. 8 and 9, wherein the midpoint of the optical functional unit was adjusted along a first adjustment direction by actuation of the first actuation part.
Figure 11:
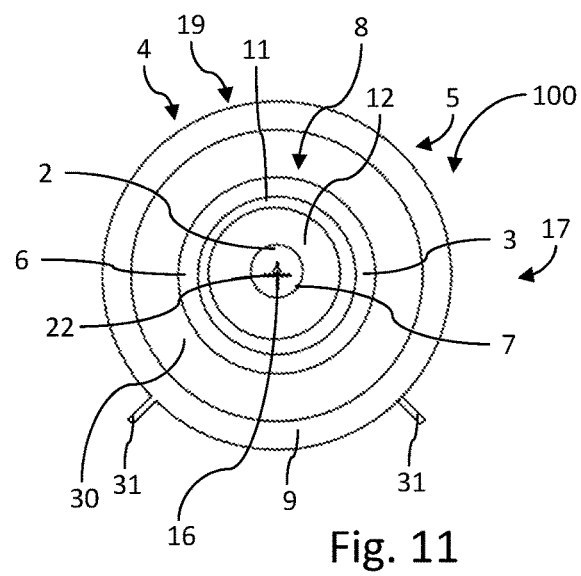
FIG. 11 shows the optical assembly in the setting in accordance with FIG. 10 in a plan view.
Figure 12:
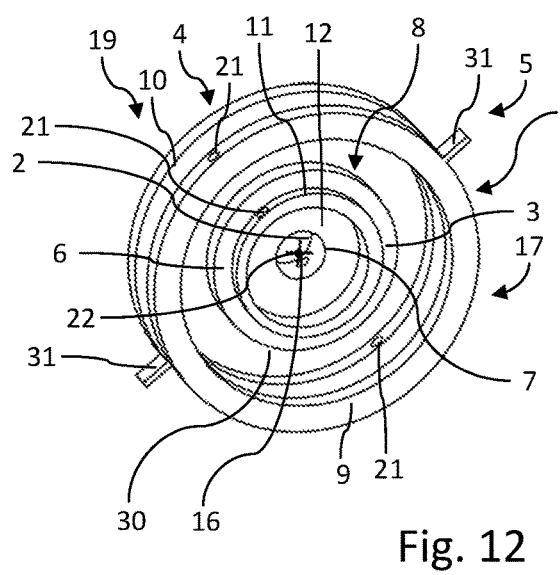
FIG. 12 shows the optical assembly from FIGS. 8 to 11, wherein the midpoint of the optical functional unit was adjusted along a second adjustment direction by actuation of the second actuation part, such that the midpoint then lies on the optical axis.
Figure 13:
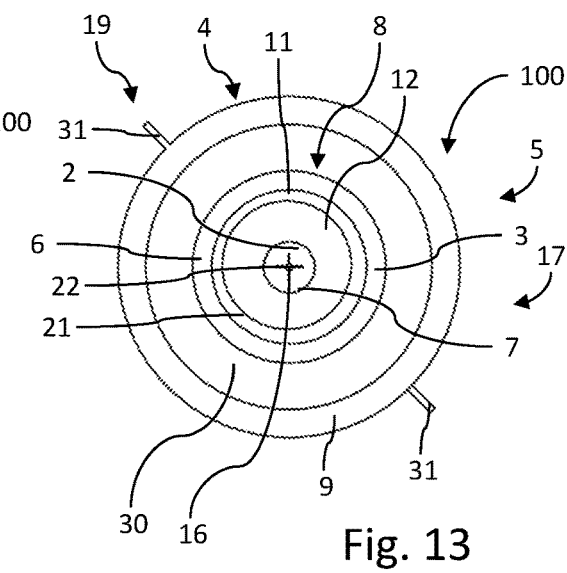
FIG. 13 shows the optical assembly in the setting in accordance with FIG. 12 in a plan view.

If a midpoint 22 of the optical functional unit 2 lies outside the optical axis 16 of the optical assembly 1, 100, as is shown by way of example in FIGS. 8 and 9, then it is possible to carry out firstly a centering of the first axis by actuation of the first actuation part 9 and a resulting displacement of the optical functional unit 2 in a first direction. In this case, the first actuation part 9 is firstly rotated by an angle such that the midpoint 22 is thereby centered in a first axis 18. As a result of the rotation of the first actuation part 9, the first holding part 11 is carried along on account of the magnetic coupling to the first actuation part 9. This process is shown in FIGS. 10 and 11. Afterward, by an actuation and rotation of the second actuation part 10 by an angle, it is possible for the midpoint 22 to be centered in a second axis 20, such that the midpoint 22 subsequently lies in the optical axis 16. As a result of the rotation of the second actuation part 10, the second holding part 12 is carried along on account of the magnetic coupling to the second actuation part 10. It would also be conceivable for the centering to be carried out in a different order, such that for example firstly the second actuation part 10 is rotated for the centering of the first or second axis and then the first actuation part 9 is rotated for the centering of the first or second axis. In this case, therefore, the adjustment in two degrees of freedom relates to an adjustment on a respective circular path.

In order to prevent incorrect couplings of the magnetic couplings 17, 19, the magnets 21 of the first magnetic coupling 17 are arranged axially offset with respect to the magnets of the second magnetic coupling 19.

In order to reduce the space requirement, the two actuation parts 9, 10 are arranged axially offset with respect to one another. The external diameter of the optical assembly 1, 100 is thus reduced overall.

The actuation parts 9, 10 can each have at least one handle element 31 in order to enable a simpler and more precise adjustment.

LIST OF REFERENCE SIGNS 1, 100 Optical assembly
2 Optical functional unit
3 Housing
4 Adjusting device
5 Operative connection
6 Housing wall
7 Carrier
8 Fixing medium
9 First actuation part
10 Second actuation part
11 First holding part
12 Second holding part
13 Observation window
14 Light source
15 Transverse plane
16 Optical axis
17 First magnetic coupling
18 x-axis
19 Second magnetic coupling
20 y-axis
21 Magnet
22 Midpoint
23 Guide device
24 Guide surface
25 Through opening
26 Light entrance side
27 Light exit side
28 Third holding part
29 Fourth holding part
30 Air space
31 Handle element
32 Horizontal connecting web
33 Vertical connecting web
34 Carrier ring
35 Outer spring element
36 Inner spring element

The invention claimed is:

1. An optical assembly (1, 100), comprising:
at least one optical functional unit (2),
a housing (3) having a housing wall (6), which at least partly encloses the optical functional unit (2), an adjusting device (4) configured to set a desired position of the optical functional unit (2) within the housing (3) and relative to the housing (3), an operative connection (5) configured to operate the adjusting device (4), the operative connection (5) being operable from outside the housing (3), the housing wall (6) at least partly enclosing the optical functional unit (2) is formed in a closed fashion at least in a region of the operative connection (5), the optical functional unit (2), after the setting of the desired position, is fixable in the housing, and the position of the optical functional unit (2) is fixable by a fixing medium (8).

2. The optical assembly (1, 100) as claimed in claim 1, wherein the optical functional unit (2) is suspended from a carrier (7), and the housing (3) encloses the carrier (7) and the optical functional unit (2).

3. The optical assembly (1, 100) as claimed in claim 2, wherein the fixing medium (8) is configured to fix at least one of the carrier (7), the adjusting device (4), or a holding part (11, 12, 28, 29).

4. The optical assembly (1, 100) as claimed in claim 2, wherein at least the optical functional unit (2) is hermetically encapsulated by the housing (3), and the optical functional unit (2) is adjusted without the hermetic encapsulation being opened.

5. The optical assembly (1, 100) as claimed in claim 4, wherein the operative connection (5) comprises at least one magnetic coupling that is configured to apply an actuation force from outside the housing that is transmitted to at least one of the carrier (7) or to at least one holding part (11, 12, 28, 29).

6. The optical assembly (1, 100) as claimed in claim 1, wherein the operative connection (5) comprises an electrical coupling between an operating part and an actuator.

7. The optical assembly (1, 100) as claimed in claim 3, wherein the housing (3) includes at least one observation window (13), and the observation window (13) is arranged in the housing (3) such that an activation of the fixing medium (8) is adapted to be carried out through the observation window (13).

8. The optical assembly (1, 100) as claimed in claim 7, wherein the fixing medium (8) is adapted to be activated by irradiation with light having a specific wavelength.

9. The optical assembly (1, 100) as claimed in claim 3, wherein the fixing medium (8) comprises a cohesive connection, and is configured as at least one of a curable or cured adhesive, or plastic, said fixing medium (8) is adapted to be introduced into the housing (3) before the housing (3) is closed, and is activatable externally after the housing (3) is closed.

10. The optical assembly (1, 100) as claimed in claim 3, wherein the fixing medium comprises at least one of a welding connection, a soldering connection, or a mechanical clamp, said fixing medium (8) is adapted to be introduced into the housing (3) before the housing (3) is closed, and is activatable externally after the housing (3) is closed.

11. The optical assembly (1, 100) as claimed in claim 2, wherein the optical functional unit (2) is adjustable relative to the housing (3) in at least two degrees of freedom lying in a transverse plane (15), and the transverse plane (15) is oriented perpendicular to an optical axis (16) of the optical assembly (1, 100), and the carrier (7) comprises a restoring element configured as at least one of a torsionally stiff or spirally guided spring.

12. The optical assembly (1, 100) as claimed in claim 2, wherein the adjusting device (4) includes at least one actuation part (9, 10) arranged outside the housing (3), and has at least one holding part (11, 12, 28, 29), the at least one holding part (11, 12, 28, 29) is connected to at least one of the carrier (7) or the optical functional unit (2), the actuation part (9, 10) is configured to be actuated such that an actuation force is transmittable to the at least one of the at least one holding part (11, 12, 28, 29) or the optical functional unit (2) through a housing wall (6), such that the at least one holding part (11, 12, 28, 29) together with the optical functional unit (2) is adjusted relative to the housing (3).

13. The optical assembly (1, 100) as claimed in claim 12, wherein a housing wall (6) is arranged between the at least one actuation part (9, 10) and the at least one holding part (11, 12, 28, 29), and the at least one actuation part (9, 10) and the at least one holding part (11, 12, 28, 29) are magnetically couplable to one another through said housing wall (6).

14. The optical assembly (1, 100) as claimed in claim 1, wherein the optical assembly (1, 100) has at least one first magnetic coupling (17) for adjusting the optical functional unit (2) in a first direction, and a second magnetic coupling (19) for adjusting the optical functional unit (2) in a second direction, each of the first and second magnetic couplings (17, 19) has at least one electromagnet or permanent magnet, or both, and the first and second magnetic couplings (17, 19) are arranged offset by an angle with respect to one another.

15. The optical assembly (1, 100) as claimed in claim 14, wherein the first magnetic coupling (17) is formed by a first actuation part (9) and a first holding part (11), and the second magnetic coupling (19) is formed by a second actuation part (10) and a second holding part (12), the first and second holding parts (11, 12) are rotatable in each case about a rotation axis, and the optical functional unit (2) is arranged eccentrically with respect to the rotation axis of the second holding part (12) in the second holding part (12) and the second holding part (12) is arranged eccentrically with respect to a rotation axis of the first holding part (11) in the first holding part (11), and the second holding part (12) is mounted rotatably within the first holding part (11) or the first holding part (11) is mounted rotatably within the housing (3).

16. The optical assembly (1, 100) as claimed in claim 2, wherein degrees of freedom in adjustment of the optical functional unit (2) are defined by a guide device (23), the guide device (23) permits an adjustment of the optical functional unit (2) exclusively in a transverse plane (15), wherein the guide device (23) is formed as a guide surface (24), against which at least one of the optical functional unit (2), the carrier (7), or a holding part (11, 12, 28, 29) bears, said guide device (23) has a through opening (25), through which an optical axis (16) extends, and the optical functional unit (2) is one or a combination of two or more of the following components: a lens, a lens system comprising a plurality of lenses, an image sensor, or a diaphragm.

17. The optical assembly (1, 100) as claimed in claim 1, wherein the housing (3) is comprised of a nonmagnetic material, and the optical assembly (1, 100) has a light entrance side (26) and a light exit side (27), wherein at least one of the light entrance side (26) or the light exit side (27) is connected to a respective optical waveguide.

18. An endoscope comprising an optical assembly (1, 100) as claimed in claim 1, wherein the optical assembly (1, 100) is arranged within an endoscope shaft.

19. A method for orienting an optical functional unit (2) within a housing (3), comprising the following:

setting a position of the optical functional unit (2) within the housing (3) using an operative connection (5)

operated from outside the housing (3), wherein a housing wall (6) at least partly enclosing the optical functional unit (2) is formed in a closed fashion at least in a region of the operative connection (5), and fixing the optical functional unit (2) in a desired position by activating a fixing medium (8).

20. The method of claim 19, further comprising:

introducing the fixing medium (8), which comprises a cohesive connection, into the housing (3) before the housing (3) is closed, and externally activating the fixing medium after the housing is closed.

* * * * *